E. P. McCeney.
File Fastener.
Nº 80,986.    Patented Aug. 11, 1868.

Witnesses;

Inventor;

United States Patent Office.

E. P. McCENEY, OF WASHINGTON, DISTRICT OF COLUMBIA.

Letters Patent No. 80,986, dated August 11, 1868.

IMPROVEMENT IN FILE-FASTENERS.

The Schedule referred to in these Letters Patent and making part of the same.

TO ALL WHOM IT MAY CONCERN:

Be it known that I, E. P. McCeney, of Washington, in the county of Washington, and District of Columbia, have invented a new and useful File-Fastener; and I do hereby declare that the following is a full, clear, and exact description thereof, reference being had to the accompanying drawings, in which—

Figure 1:
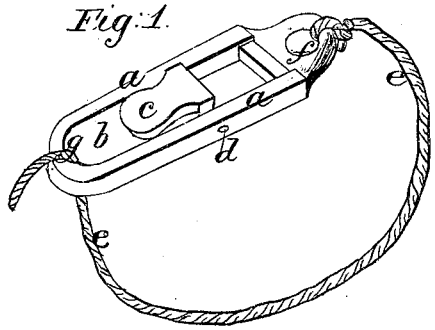
Figure 1 is a perspective view.

The nature of my invention consists in making the lever of a file-fastener in two parts, and hinged together, as will be hereinafter described.

To enable others skilled in the art to make and use my invention, I will proceed to describe its construction and operation.

In the drawing—

$a$ represents the frame; $b$, the lever; $c$, the handle, hinged to the lever $b$; $d$, the pin, which passes through the joint of the lever into each side of the frame $a$, and on which the lever works; $e$, the cord, one end of which is tied to the eye $f$, in one end of the frame $a$, and the other end is passed between the end of the lever $b$ and the inside of the end of the frame $a$, as seen at $g$.

The papers are placed inside of the cord $e$, which is then drawn tight, and the lever $b$ pressed into position betwen the sides of the frame $a$.

Figure 2:
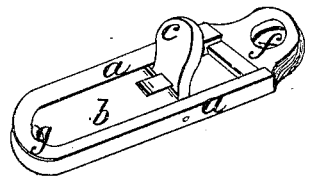
Figure 2 is a perspective view, without the cord attached.
Figure 3:
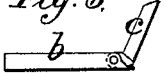
Figure 3 is a side view of the lever and handle.

The handle $c$ of the lever $b$ is then left flat with the surface of the lever, as seen in fig. 1, but when it is desired to loosen the cord, the handle $c$ is raised, and is then at an angle of about forty-five degrees to the lever $b$, as seen in fig. 2, and by pressing against the handle $c$, the lever $b$ is easily raised and the cord released.

By hinging the lever so that the handle can lie flat on the top of the lever, it is much more convenient for packing away the files, and it is not so liable to open and release the cord.

Having thus fully described my invention, what I claim, and desire to secure by Letters Patent, is—

Hinging a handle to the lever of a file-fastener, substantially in the manner and for the purpose herein described.

E. P. McCENEY.

Witnesses:
T. C. Theaker,
G. A. C. Smith.